J. W. ANDERSON.
TROLLEY WHEEL.
APPLICATION FILED APR. 5, 1913.
1,143,880. Patented June 22, 1915.
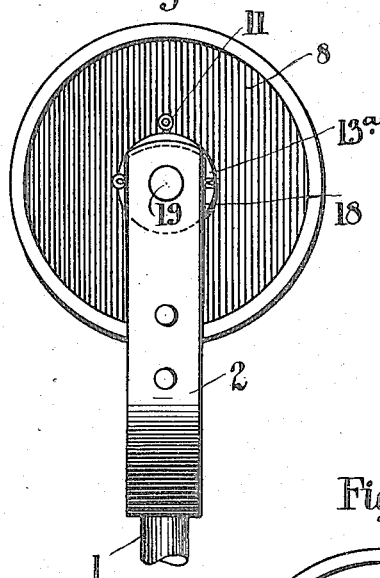
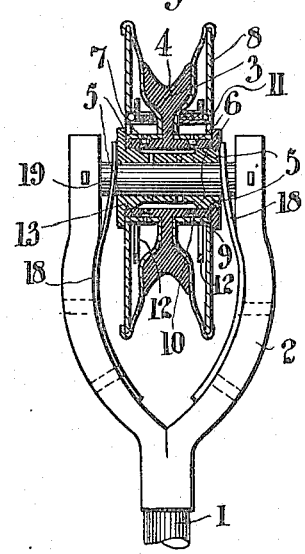
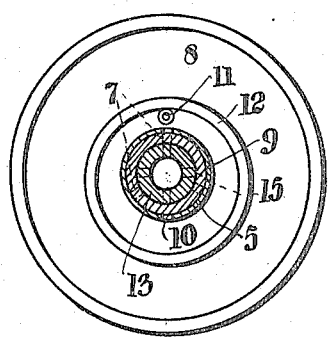
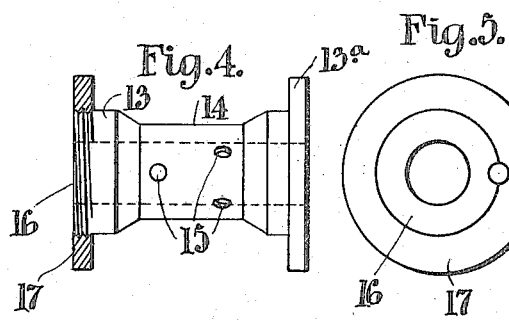
Witnesses
Inventor.
J. W. ANDERSON ated June 22, 1915.# UNITED STATES PATENT OFFICE.

JOHN WILLIAM ANDERSON, OF HAMILTON, ONTARIO, CANADA, ASSIGNOR, BY MESNE ASSIGNMENTS, TO AMERICAN TROLLEY WHEEL COMPANY, INC., OF BUFFALO, NEW YORK, A CORPORATION OF NEW YORK.

TROLLEY-WHEEL.

1,143,880.

Specification of Letters Patent.

Patented June 22, 1915.

Application filed April 5, 1913. Serial No. 759,112.

*To all whom it may concern:*

Be it known that I, JOHN WILLIAM ANDERSON, of the city of Hamilton, in the county of Wentworth, in the Province of Ontario, Canada, have invented certain new and useful Improvements in Trolley-Wheels, of which the following is the specification.

My invention relates to improvements in trolley wheels and is an improvement on a similar invention for which I have filed an application in the United States Patent Office on July 11th, 1912, under Serial Number 708,903, and the object of the invention is to devise a trolley wheel of the self-oiling type, the oil being contained in hollow flanges of the wheel and said flanges being capable of revolving independently of the wheel portion.

A further object is to devise means for preventing the spreading of the flanges from the wheel portion while at the same time allowing the flanges to revolve independently of the wheel portion, and a still further object is to provide means whereby a better contact will be made between the wheel and the harp of the trolley pole.

My invention consists of a grooved trolley wheel portion having extending shanks formed thereon with circumferential grooves therein, and oil holes extending from the bottom of the grooves into the hollow interior of the wheel portion, wheel flanges mounted on the said shanks and having oil holes in the surfaces thereof abutting the shanks, said holes registering with the grooves therein, vents in the flanges for the insertion of the oil, rings in the flanges, a hollow bushing having a reduced central portion with oil holes extending into the interior and having an enlarged head, the other end being suitably threaded, said bushing being adapted to be inserted into the interior of the wheel and a nut threaded onto the threaded end of the bushing whereby the wheel flanges are prevented from spreading away from the wheel portion, all as hereinafter more particularly described, and illustrated in the accompanying drawing in which:—

Figure 1 represents a side elevation of a wheel constructed according to my invention showing the same applied to the harp of the trolley pole. Fig. 2 is a cross-section thereof. Fig. 3 is a vertical section through the wheel at right angles to Fig. 2. Fig. 4 is a side view of the bushing showing the nut in section, and Fig. 5 is an end view thereof.

Like characters of reference indicate corresponding parts in the different views.

1 is the trolley pole and 2 is the harp thereof.

3 is the wheel portion having the grooved periphery 4 and the shanks 5 with circumferential grooves 6 therein.

7 are the oil holes extending through the same.

8 are the wheel flanges having the central bushings 9 with oil holes 10 therethrough, said flanges being hollow and designed to constitute oil reservoirs.

11 are vents for the insertion of the oil into the flanges. The flanges are mounted on the shanks 5 and are provided in their interiors with loosely disposed rings 12.

13 is the bushing extending through the flanges and wheel portion and having the enlarged head 13ª and the reduced central portion 14 with oil holes 15 extending into the interior of the bushing.

16 is the threaded end of the bushing and 17 is a nut threaded thereon.

18 are springs on the inner faces of the harp adapted to bear against the enlarged head 13 and the nut 17 of the bushing.

19 is the axle extending through the wheel whereby the same is mounted on the harp.

From the above description it will be seen that the bushing holds the portions of the wheel in position and prevents the spreading of the flanges away from the wheel portion while at the same time permitting the flanges to revolve independently of the wheel portion. Also the enlarged head and nut of the bushing make a better contact with the harp springs than the flush bushing shown and described in my former application. Further the oil can work its way down and lubricate the axle as well as the bearing surfaces of the wheel portion and flanges.

As many modifications can be made in the invention without departing from the spirit thereof or the scope of the claim the form shown is to be taken in an illustrative and not in a limiting sense.

What I claim as my invention and desire to secure by Letters Patent, is:—

In a trolley wheel, the combination with a wheel-portion, of independent hollow flanges forming lubricant reservoirs, with their inner walls conforming to the outer surfaces or contours of said wheel-portion, said wheel-portion having a concentric tubular shank portion provided with lubricant feeding passages, said lubricant-reservoirs having their bottoms encompassing said tubular wheel-shank portion, said bottoms having lubricant-feeding passages registering the lubricant-feeding passages of said wheel shank portion, and a bushing having an intermediate annular reduction, also having lubricant-feeding passages, said tubular wheel shank portion encompassing said bushing, said bushing having a headed end and securing means on its opposite end, said headed and securing means connecting together said bushing and said tubular wheel shank-portion.

In testimony whereof I have signed at Hamilton, in the county of Wentworth, in the Province of Ontario, Canada, this 10th day of March 1913.

JOHN WILLIAM ANDERSON.

In the presence of—
E. M. NEAME,
R. M. FETHERSTONHAUGH.

Copies of this patent may be obtained for five cents each, by addressing the "Commissioner of Patents, Washington, D. C."